United States Patent
Matsunaga et al.

(10) Patent No.: US 11,368,893 B2
(45) Date of Patent: Jun. 21, 2022

(54) COMMUNICATION DEVICE, COMMUNICATION METHOD, AND PROGRAM FOR HANDOVERS

(71) Applicant: Honda Motor Co., Ltd., Tokyo (JP)

(72) Inventors: Hideki Matsunaga, Wako (JP); Masaru Otaka, Wako (JP); Satoshi Onodera, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 18 days.

(21) Appl. No.: 17/173,456

(22) Filed: Feb. 11, 2021

(65) Prior Publication Data

US 2021/0168688 A1  Jun. 3, 2021

Related U.S. Application Data

(63) Continuation of application No. PCT/JP2019/014303, filed on Mar. 29, 2019.

(51) Int. Cl.
*H04W 4/00* (2018.01)
*H04W 36/30* (2009.01)
*H04W 36/32* (2009.01)

(52) U.S. Cl.
CPC ........... *H04W 36/30* (2013.01); *H04W 36/32* (2013.01)

(58) Field of Classification Search
CPC ....... H04W 36/30; H04W 36/32; H04W 4/40; H04W 24/10
USPC .......................................................... 370/332
See application file for complete search history.

(56) References Cited

U.S. PATENT DOCUMENTS

| 10,470,119 | B2 * | 11/2019 | Yoshino | H04W 48/20 |
| 11,051,215 | B2 * | 6/2021 | Yang | H04W 36/08 |
| 11,310,648 | B2 * | 4/2022 | Agiwal | H04W 76/10 |
| 2006/0030272 | A1 | 2/2006 | Nakamizo et al. | |
| 2008/0086562 | A1 * | 4/2008 | Etoh | H04L 43/06 709/224 |
| 2009/0104911 | A1 * | 4/2009 | Watanabe | H04W 36/30 455/436 |
| 2009/0168689 | A1 * | 7/2009 | Itagaki | H04W 72/085 370/315 |
| 2010/0080193 | A1 * | 4/2010 | Sakai | H04W 36/34 370/332 |

(Continued)

FOREIGN PATENT DOCUMENTS

| EP | 1612955 A1 | 1/2006 |
| EP | 2974445 B1 | 3/2013 |

(Continued)

OTHER PUBLICATIONS

European Search Report of EP application No. 19923107, dated Jan. 27, 2022.

(Continued)

*Primary Examiner* — Amancio Gonzalez
(74) *Attorney, Agent, or Firm* — Aaron Fong; American Honda Motor Co., Inc.

(57) ABSTRACT

The communication device collects information regarding the communication quality of communication by the first other communication device and information regarding the type of the first other communication device; and transmits information regarding the communication quality corresponding to at least one of the types along with the information regarding the types to a second other communication device based on the information collected.

20 Claims, 4 Drawing Sheets

(56) References Cited

U.S. PATENT DOCUMENTS

| | | | |
|---|---|---|---|
| 2010/0271966 A1* | 10/2010 | Hirano | H04W 24/10 370/252 |
| 2011/0263244 A1 | 10/2011 | Kobayashi et al. | |
| 2011/0294436 A1* | 12/2011 | Ono | H04B 17/309 455/39 |
| 2015/0078344 A1* | 3/2015 | Futaki | H04W 36/0083 370/332 |
| 2015/0141018 A1 | 5/2015 | Kapoulas et al. | |
| 2015/0334625 A1 | 11/2015 | Banks et al. | |
| 2016/0007403 A1 | 1/2016 | Futaki et al. | |
| 2016/0018821 A1 | 1/2016 | Akita et al. | |
| 2018/0054725 A1* | 2/2018 | Agiwal | H04W 76/10 |
| 2018/0234901 A1 | 8/2018 | Suh et al. | |
| 2020/0068580 A1* | 2/2020 | Tang | H04W 72/0473 |
| 2020/0145125 A1* | 5/2020 | Wang | H04W 72/0446 |
| 2021/0076236 A1* | 3/2021 | Kimura | H04W 24/10 |

FOREIGN PATENT DOCUMENTS

| | | | |
|---|---|---|---|
| EP | 2963966 | B1 | 1/2016 |
| EP | 2348764 | B1 | 11/2018 |
| JP | 2016017898 | A | 2/2016 |
| JP | 2016024613 | A | 2/2016 |
| JP | 2017216663 | A | 12/2017 |
| WO | WO2004091111 | A1 | 10/2004 |
| WO | WO2010055721 | A1 | 5/2010 |
| WO | WO2014132560 | A1 | 9/2014 |
| WO | 2014164144 | A1 | 10/2014 |

OTHER PUBLICATIONS

International Search Report of related international application PCT/JP2019/014303, dated Jun. 18, 2019.

English Translation of International Search Report of related international application PCT/JP2019/014303, dated Jun. 18, 2019.

Written Opinion of the International Searching Authority of related international application PCT/JP2019/014303, dated Jun. 18, 2019.

* cited by examiner

FIG. 6

COMMUNICATION DEVICE, COMMUNICATION METHOD, AND PROGRAM FOR HANDOVERS

RELATED DISCLOSURE

This disclosure is a continuation of International Patent Application No. PCT/JP2019/014303 filed Mar. 29, 2019 titled Communication Device, Communication Method, and Program, which is hereby incorporated by reference in its entirety.

FIELD

The present disclosure relates to handover technology, and more particularly, to a terminal device switching base stations based on communication environment recognition.

BACKGROUND

Remote operation allows remotely located operators to operate and move vehicles. One element of remote operation may be the ability to sufficiently suppress communication delays between an operator device operated by an operator performing remote operation and a terminal device installed in a vehicle.

It is assumed that a cellular wireless communication network in which a communication area has been deployed throughout an entire region may be used for communication to perform vehicle traveling control through a remote operation. In this case, since a terminal device installed in the vehicle moves in step with the movement of the vehicle, it may be difficult to maintain the connection with a single base station. Thus, the terminal device may operate to perform handover processing for switching from a base station during connection to another base station in a timely manner to maintain a connection to the network (along with a connection to the operator device).

Even if the communication delay is sufficiently small between the terminal device and the base station while connected, the communication delay may become unacceptably large between the terminal device and the base station after the handover. For this reason, it is important that the terminal device provide a mechanism for continuous communication in a communication path, whereby communication quality including the prevention of communication delays is sufficiently ensured.

SUMMARY

According to one aspect of the present disclosure, a communication device is provided. The communication device may include a memory for storing computer readable code and a processor operatively coupled to the memory, the processor configured to perform processes. The processes may include collecting information regarding a communication quality of a first other communication device and information regarding a type of the first other communication device and transmitting the information regarding the communication quality of the first other communication device to a second other communication device based on the information collected.

According to another aspect of the present disclosure, a communication device is provided. The communication device may include a memory storing instructions when executed by a processor causes the processor to perform processes. The processes may include collecting information regarding the communication quality by a first other communication device and information regarding a type of the first other communication device and transmitting, based on the collected information, information regarding the communication quality along with information regarding the type to a second other communication device.

According to yet another aspect of the present disclosure, a computer-implemented handover method in a communication device is provided. The method may include collecting information regarding the communication quality of a first other communication device and information regarding a type of the first other communication device based on the collected information, the information regarding the communication quality of the first other communication device along with the information regarding the type to a second other communication device.

BRIEF DESCRIPTION OF THE DRAWINGS

The accompanying drawings are included in the specification and constitute part thereof, illustrate embodiments of the present disclosure, and, together with the description, are used to explain the principles of the present disclosure.

DETAILED DESCRIPTION

Hereinafter, embodiments will be described in detail with reference to the accompanying drawings. Note that the following embodiments are not limited to the disclosure according to the claims and all combinations of the features described in the embodiments are not required of the disclosure. Two or more features of the plurality of features described in the embodiments may optionally be combined. In addition, the same reference numerals are assigned to the same or similar configurations, with redundant descriptions thereof omitted.

Generally described, the present disclosure provides techniques for enabling a communication device to predict communication quality in an actual communication environment. The communication device according to one aspect may collect information regarding the communication quality of a first other communication device and information regarding a type of the first other communication device. The communication device may transmit the information regarding the communication quality of the first other communication device to a second other communication device having the type of the first other communication device based on the information collected.

Advantageously, the communication device may predict communication quality in an actual communication environment. Other features and advantages of the present disclosure will become apparent from the following description with reference to the accompanying drawings.

Figure 1:
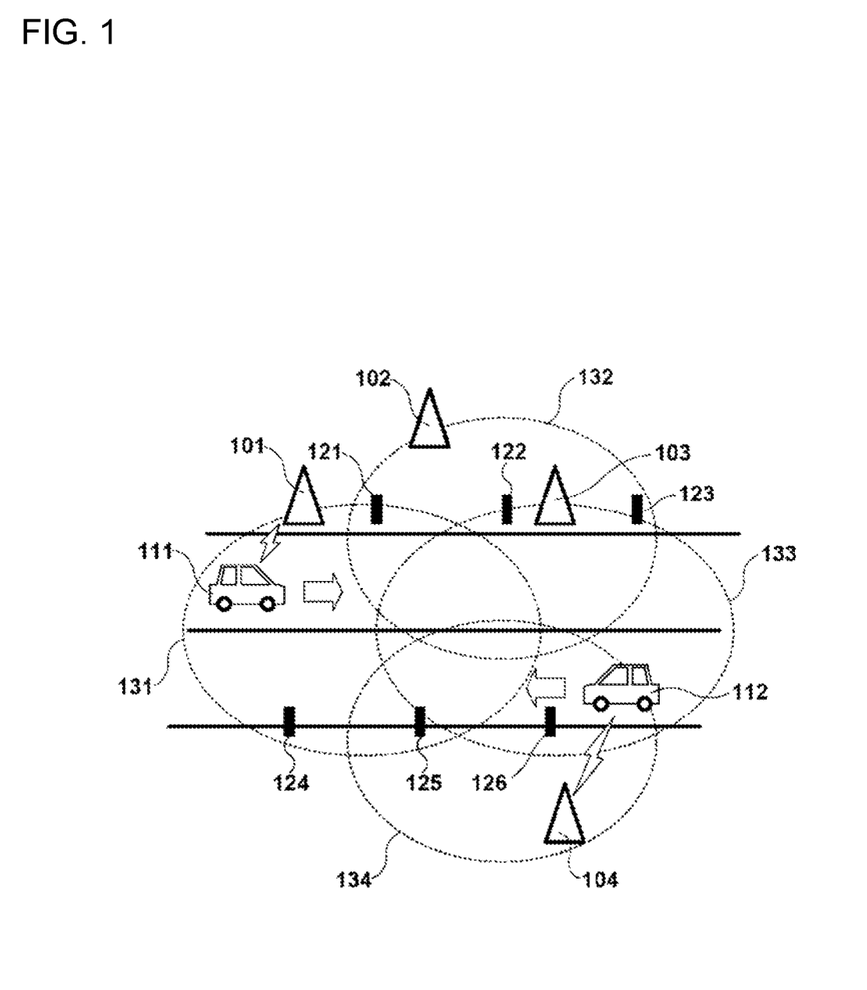
FIG. 1 is a diagram illustrating an example of a system configuration in accordance with one aspect of the present disclosure.

FIG. 1 illustrates an example of a configuration of a communication system according to the present disclosure. The present communication system is, for example, a cellular wireless communication system and is configured to include base stations 101, 102, 103, and 104, terminal devices 111 and 112 that move, and fixed terminal devices 121, 122, 123, 124, 125, and 126. The base stations 101, 102, 103, and 104 form cells 131, 132, 133, and 134 respectively, and each of the base stations is connected to the terminal device in the cell formed by the terminal device itself to perform wireless communication. Note that the terminal device performs wireless communication in connection with any of the base stations forming cells that cover the position of the terminal device itself. That is, the cell may be disposed so as to overlap other cells in at least part of the cell, and in the overlapping area, the terminal device connects to the base station forming any of the cells. In one example, each of the base stations 101 to 104 is a base station (gNodeB) of a fifth generation (5G) cellular communication system, wherein each of the terminal devices 111 to 112 and each of the terminal devices 121 to 126 may be a terminal (UE) of a 5G cellular communication system. However, the communication device is not limited thereto, with these communication devices capable of being compliant with LTE (long term evolution) or other generation cellular communication standards. Each of the base stations 101 to 104 may be a base station directly connected to a core network (for example, evolved packet core (EPC)), or may be a relay station wirelessly connected to another base station.

Note that, in the present disclosure, an example of a case will be described in which each of the terminal devices 111 to 112 installed in a vehicle performs wireless communication such as remote operation and controls the driving of the vehicle. However, this is merely an example, with control for any terminal device having wireless capability that may be connected to a cellular communication network such as a smart phone, a mobile phone, a personal computer, or the like to perform predetermined operations capable of being performed based on the procedure described below. In general, one base station may form a plurality of cells; however, in the present disclosure, an example is given in which one base station forms one cell. Note that in the following description, for the case in which the base station transmits information to the terminal device, the information may be transmitted for each cell. In other words, for the case in which the base station forms a plurality of cells, multiple information transmissions may be performed for each cell.

In the example of FIG. 1, the terminal device 111 is within the range of the cell 131 formed by the base station 101, indicating a case in which wireless communication is performed in connection with the base station 101. Moreover, in the example illustrated in FIG. 1, the terminal device 112 is present within the range of the cell 134 formed by the base station 104, indicating a case in which wireless communication is performed in connection with the base station 104. Although the position of the terminal device 112 is also within the range of the cell 133 formed by the base station 103, the terminal device 112 may connect to the base station 104 due to, for example, the wireless quality of the signal from the base station 104 being higher than the wireless quality of the signal from the base station 103, for example.

Moreover, in the example illustrated in FIG. 1, an example is illustrated in which the fixed terminal devices 121 to 126 are disposed on the shoulder along the road. Each of the terminal devices 121 to 126 is connected to a base station that forms the cell in which the terminal device is present as with the terminal devices 111 to 112. Note that the terminal devices 121 to 126 are used to measure communication quality and perform communication with the base station on a regular basis, for example, and collect communication quality information in the base station and the like, for example, via communication of the call. Note that the terminal devices 121 to 126 may be disposed in the center separation line rather than the roadway or may, for example, be embedded in the road surface. The terminal devices 121 to 126 may be disposed in a position away from the road.

In the present disclosure, the terminal device performs predetermined control processing using communication quality information such as wireless quality and communication delays between the terminal device and a device for communication partner such as an operator device (not illustrated) operated by an operator by remote operation. Note that the communication quality here is an actually measured quality such as communication delays actually measured upon actual communication and wireless quality (signal to interference and noise power ratio (SINR), signal to noise ratio (SIR, reference signal received power (RSRP, reference signal received quality (RSRQ), and received signal strength indication (RSSI), etc.). The predetermined control process may be control for automatic operation or remote operation, as one example. For example, the terminal device performs limited control such as, for example, stop control or acceleration/deceleration control for the case in which the wireless quality is relatively low or when the communication delay is large. On the other hand, when wireless quality is relatively high or when communication delays are small, the terminal device performs control with a high degree of freedom such as, for example, lane change control. Further, the prescribed control processing may involve selection control of the base station to which the terminal device is connected. For example, the terminal device makes a connection with a base station corresponding to a path capable of sufficiently reducing communication delays.

On the other hand, the base station according to the present disclosure notifies the terminal device of information indicating the actually measured communication quality acquired when the other terminal device has connected to the base station and communicated in the past. At this time, the communication quality between the base station and the terminal device may vary greatly depending on the type of terminal device, such as whether the terminal device is moving or fixed or whether the terminal device is an on-board terminal or a smartphone. For example, while the effect of Doppler shift is strongly affected when the terminal device is moving, such effect is small when the terminal device is fixed. Moreover, depending on whether the movement speed of the terminal device is high or low, the intensity of the effect of the Doppler shift is significantly different. In addition, depending on whether the terminal device is a terminal device that is not restricted in size, such as a terminal device for remote operation, or a handheld terminal device that is limited in size such as a smartphone, as the performance of the mountable antenna and circuit may vary greatly, the communication quality may be greatly different between these terminal devices. Furthermore, for a terminal device in which a frequency band dedicated to remote operation is allocated or a terminal device that shares the same frequency band as another type of terminal device, the terminal device that may use a dedicated frequency band has properties that keep communication delays short. Thus, for the case in which the base station apparatus collects communication quality and notifies the terminal device without distinguishing between these types of different terminal devices, depending on the terminal device, the received communication quality may deviate from the communication quality that may actually be enjoyed by the terminal device.

Thus, the base station of the present disclosure collects the communication quality in the past when communicating with a first terminal device and the type of first terminal device, then notifies a second terminal device of the communication quality corresponding to the at least one type of first terminal device based on the collected information. In this way, the second terminal device may acquire the communication quality information corresponding to the type of the first terminal device, for example, in order to be able to ascertain the expected communication quality when connected to the base station.

Note that the base station may transmit, to the second terminal device, the communication quality as well as information on the type of terminal device corresponding to the communication quality. For example, the base station may only notify the second terminal device of information regarding the communication quality corresponding to a prescribed type; however, in such a case, the second terminal device is capable of recognizing which type of terminal device the communication quality corresponds to without the base station providing information on the type of terminal device. On the other hand, for the case in which the base station may provide information on the communication quality corresponding to multiple types, the second terminal device may not be able to ascertain which type of terminal device the communication quality corresponds to without the base station notifying the type of communication quality to which the communication quality relates. Thus, the base station notifies the second terminal device of information regarding communication quality and information regarding which terminal device type the communication quality corresponds to, thereby allowing the second terminal device to ascertain to which type of terminal device the notified communication quality corresponds. Note that, for this reason, the base station may function to manage the corresponding communication quality for each type of terminal device. According to this configuration, the communication quality collected in communication with a certain type of terminal device may be managed separately from communication quality in communication with other types of terminal devices. For this reason, the base station may consolidate the communication quality for each type of terminal device and make the value indicated by the information regarding communication quality notified to the second terminal device a highly accurate value close to the actual communication quality.

Moreover, the base station may acquire information indicating the type of second terminal device and transmit communication quality information corresponding to the type of the second terminal device. In this way, the base station may selectively transmit information regarding the communication quality expected to be utilized by the second terminal device to the second terminal device. Further, the base station may not provide the second terminal device with communication quality information that does not correspond to the type of second terminal device. As a result, information that is considered necessary for the second terminal device is notified to the second terminal device, thereby suppressing the amount of information to be transmitted and received by not notifying unnecessary information (information corresponding to other types). Note that the base station may acquire information on other devices for controlling the second terminal device. Even in this case, the base station may acquire the type of second terminal device to be controlled by this other device and provide information on the communication quality corresponding to the type to the other device.

Note that the base station may provide the information of the collected communication quality to the second terminal device as is, or may generate information to be provided based on the information of the collected communication quality. For example, the base station may generate information to be provided by collecting communication quality in communication with multiple terminal devices of a prescribed type and calculating the average value, variance, or the like of the communication quality.

Furthermore, the communication quality information corresponding to the predetermined type may be operated so as to be higher or lower than the communication quality acquired in the actual environment. For example, the base station may identify information regarding the communication quality corresponding to a terminal device of a moving type as a value lower than the actually measured communication quality. In this way, the base station may generate information regarding communication quality to be provided to other devices taking into consideration the possibility that the mobile type of terminal device performs communication at the communication quality lower than the average communication quality due to movement. The base station may identify information on communication quality corresponding to a fixed type of terminal device as a value higher than the actually measured communication quality. In this way, the base station may generate information regarding communication quality so as to indicate that the terminal device of a fixed type may actually communicate with a quality higher than the communication quality for the case in which the average communication quality deteriorates as a result of the fact that the terminal device communicates at a temporarily low communication quality. Furthermore, the base station may identify information on communication quality corresponding to a terminal device of a moving type as a value lower than the actually measured communication quality, while identifying information regarding the communication quality corresponding to the terminal device of the fixed type as a value higher than the actually measured communication quality. Note that, for example, in a time zone in which there are a large number of terminal devices of a moving type, a terminal device of a fixed type may be affected by fading due to the presence of the terminal device of the moving type; however, it is expected that the fixed type of terminal device may communicate in a semi-static environment in a time zone in which there are no terminal devices of a moving type. For this reason, the configuration may be set such that the difference between the actual communication quality and the value indicated by the information regarding the communication quality provided to the other device is different. Similarly, based on other conditions such as weather conditions, frequency conditions, and the like, the configuration may be set such that the difference between the actual communication quality and the value indicated by the information regarding the communication quality provided to the other device is different. Moreover, for a terminal device of a moving type, the configuration may be set such that the difference between the actual communication quality and the value indicated by the information regarding the communication quality provided to the other device is different. This is because the faster the movement speed, the greater the Doppler shift, which does not facilitate stable communication. That is, as the movement speed increases, values lower than the actual communication quality value may be set as the value indicated by the information regarding the communication quality provided to the other device. Note that, for the case in which the movement speed is lower than the predetermined value, values higher than the actual communication quality may be set as the value indicated by the information regarding the communication quality provided to the other device as with the fixed type of terminal device. That is, for a terminal device of a fixed type, a value higher than the actual communication quality is set as the value indicating the communication quality to be provided to another device, with information regarding the communication quality capable of being generated such that the difference between the value indicated by the communication quality information provided to the other device and the actual communication quality becomes small in response to the movement speed increasing from 0, and this difference becoming 0 in response to the movement speed reaching the predetermined value. Note that, in response to the movement speed increasing beyond the predetermined value, the value indicated by the information regarding the communication quality may be further reduced. However, for a movement speed greater than or equal to a predetermined value, the actual communication quality may be set as a value indicated by the information regarding the communication quality.

In addition, the types of terminal devices do not only include the moving type and fixed type, but may also include a type corresponding to, for example, an on-board terminal or a smartphone, as described above, and the like. Furthermore, the on-board terminal may be further classified into a type that performs high quality remote operation, a type that performs low quality remote operation, a type that performs automatic operation, types other than these types, and the like. Thus, the value indicated by the communication quality information may be set based on these types and the actual communication quality. For example, the value indicated by the information regarding the communication quality corresponding to the type of performing high quality remote operation may be set at a value sufficiently lower than the actual communication quality. For example, the value indicated by the information regarding the communication quality is set at a value lower than the lowest quality in the actual environment. This allows a device that has acquired this information to perform remote operation control assuming the most stringent communication environment with which it may come into contact during remote operation. In one example, as long as the communication quality corresponding to a harder environment than the actual environment does not satisfy a predetermined quality, control may be performed to prevent the terminal device for remote operation from being connected to the base station of the source of communication quality. Moreover, values indicated by information regarding the communication quality corresponding to a type that performs poor quality remote operation may be set at a value higher than that indicated by the information regarding the communication quality corresponding to the type of performance of performing high quality remote operation with respect to the same actual communication quality. Further, the value indicated by the information regarding the communication quality corresponding to the type in which the automatic operation is performed may be set at a value higher than the value indicated by the information regarding the communication quality corresponding to the type that performs low quality remote operation with respect to the same actual communication quality.

Note that the above description is an example, and for example, the base station may notify other base stations or a network node other than the base station, for example, of communication quality corresponding to at least one type based on the collected information. Moreover, for example, network nodes other than base stations may collect communication quality when they communicated with the first other communication device in the past via other devices and the type of this first other communication device (for example, the terminal device). The network node may then notify the second other communication device (e.g., other network nodes such as terminal devices, base stations, etc.) corresponding to at least one type based on the collected information. In addition, a device participating in predetermined control in the terminal device may collect or notify information, or information may be provided to such a device. For example, a remote driving controller may collect historical communication quality information with the on-board terminal device in either a remote driving vehicle, and may notify other remote driving control devices and the terminal device of the remote driving vehicle of the collected information. Further, the terminal device may be configured to acquire communication quality for communication with a first control device for remote operation, then transmit communication quality information in communication with a communication partner device of the type of remote operation control device, for example, to the second control device. In this way, the main component that performs information acquisition and notification may be a base station as well as any communication device such as a network node, a prescribed control execution main body of the terminal device, and the like. Similarly, the main constituent provided with information may be a terminal device as well as any communication device such as a base station, a network node, a prescribed control execution main body of the terminal device, and the like. That is, a communication device, a mating device, and other communication devices may be communication devices of various aspects, so long as the communication device of the source of information collects communication quality via communication performed in the past as well as information on the type of mating device and notifies other communication devices of the information of communication quality corresponding to one or more types.

Note that the device receiving the information acts as an information processing apparatus that processes the information and performs predetermined control. For example, for the case in which the information processing apparatus is a terminal device, the information processing apparatus may determine whether the base station to which the information processing apparatus is connected, handover execution, or the like may be determined based on the information provided, and may perform various controls for the handover. For example, the information processing apparatus may be configured to connect to a base station with good communication quality (e.g., short communication delays). Moreover, for example, in the event the information processing apparatus is a remote operation operator device, the information processing apparatus may vary the level of remote driving for the remote driving vehicle based on the information provided. For example, the information processing apparatus may vary the level of remote operation depending on the communication quality. In one example, the information processing apparatus may perform high quality remote operation control when the communication quality is relatively high and may perform low quality remote operation control when the communication quality is relatively low.

Note that, as described above, the information processing apparatus may receive communication quality information corresponding to each of a plurality of types. For example, the information processing apparatus may receive the information regarding the communication quality corresponding to a mobile type of a terminal device and the information regarding the communication quality corresponding to a fixed type of terminal device. The information processing apparatus may determine the prioritization for each of a plurality of types and perform the above-described predetermined control using information received in accordance with the priority order. For example, the information processing apparatus may perform predetermined control using information regarding the communication quality for fixed terminal devices. For a fixed terminal device, samples with respect to considerable communication quality may be acquired by periodically performing communication after the terminal device is disposed. Thus, by using the communication quality of the fixed terminal device preferentially, the information processing apparatus may perform predetermined control processing on the basis of accurate communication quality. On the other hand, in an environment in which a large number of terminal devices exist, the value indicated by the information regarding the communication quality of the fixed terminal device may be too high for the actual communication environment. For this reason, the information processing apparatus may preferentially use information regarding the communication quality for the terminal device to be moved for example, in an environment in which the total number of terminal devices is large, to perform predetermined control processing. The information processing apparatus may estimate the communication quality in an actual environment by adding the value indicated by the information regarding the plurality of communication delays corresponding to each of a plurality of types after being multiplied by a weight coefficient. Here, the weight coefficient for a value corresponding to a type having high priority is defined as a value greater than the weight coefficient for a value corresponding to a type having low priority. For example, in the information processing apparatus, the greater the total number of terminal devices, the greater the weight coefficient that is multiplied by the value corresponding to the terminal device to be moved, and the smaller the weight coefficient that is multiplied by the value corresponding to the fixed terminal device. Further, in the information processing apparatus, the smaller the total number of terminal devices, the greater the weight coefficient that is multiplied by the value corresponding to the fixed terminal device, and the smaller the weight coefficient that is multiplied by the value corresponding to the moving terminal device. Note that by setting the minimum value of the weight coefficient to be 0, communication quality information corresponding to any type may not be used. That is, the information processing apparatus may selectively use one or more of the communication qualities corresponding to the plurality of types.

Note that, here, a case has been described in which the type of terminal device is a fixed terminal device; however, the information processing apparatus may similarly use information regarding the communication quality for other types. For example, for the case in which the type of terminal device to perform the predetermined control process is an on-board terminal device of a remote driving vehicle, control is performed such that communication quality information corresponding to the type of remote driving vehicle is emphasized, while information on the communication quality corresponding to the other type is not emphasized. In other words, for the case in which the information processing apparatus performs control processing on the terminal device, the information processing apparatus may determine information regarding the communication quality to be emphasized in accordance with the type of terminal device to be controlled. Furthermore, the information processing apparatus may estimate the communication quality in a real environment by, for example, increasing the weight coefficient for the value indicated by the information regarding the communication quality to be emphasized, and reducing the weight coefficient for the value indicated by the information regarding the communication quality that is not emphasized. In this way, the information processing apparatus may acquire information regarding the communication quality corresponding to types of a plurality of terminal devices and estimate the communication quality in a real environment.

In the following, examples of the configuration of each device and the process flow for performing the process above will be described. Note that, in the following, the device that collects the communication quality of communication between the terminal device and other devices and types of other devices and transmits information regarding the communication quality is referred to as a communication device, while a device that acquires information from the communication device and performs a predetermined control process is referred to as an information processing apparatus.

Figure 2:
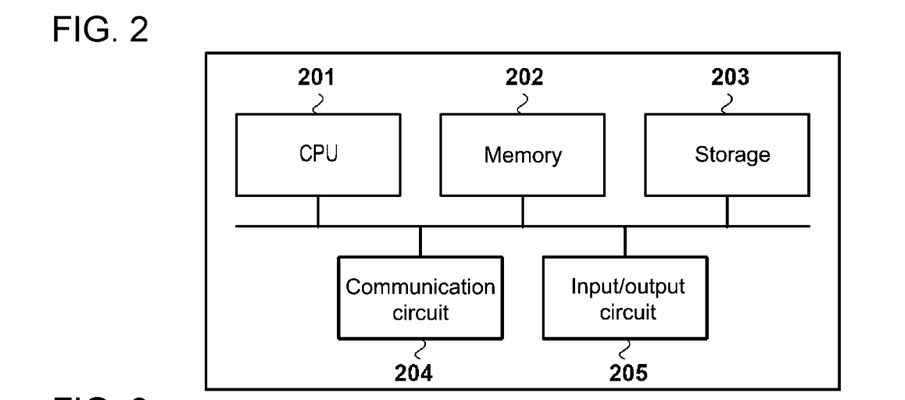
FIG. 2 is a diagram illustrating a hardware configuration example of a communication device and an information processing apparatus in accordance with one aspect of the present disclosure.

FIG. 2 illustrates an example of the hardware configuration of a communication device and an information processing apparatus according to the present disclosure. The communication device and the information processing apparatus are general purpose computers in one example and have, for example, a CPU 201, a memory 202, a storage 203, a communication circuit 204, and an input/output circuit 205. The CPU 201 executes, for example, a program stored in the memory 202 to perform as subsequently described and control the entire signal. Note that the CPU 201 may be replaced by any one or more processor(s) such as an MPU, an ASIC, or the like. The memory 202 holds a program for causing the communication device and the information processing apparatus to perform various processes, functioning as a work memory during program execution. The memory 202 is, in one example, RAM (random access memory) and ROM (read-only memory). The storage 203 is, for example, a removable external storage, a built-in hard disk drive, or the like, and holds various types of information. The communication circuit 204 performs signal processing on communications, acquires various information from the external device through the communication network, and transmits the various information to the external device. Note that the information acquired by the communication circuit 204 may, for example, be stored in the memory 202 and the storage 203. Note that the communication device and the information processing apparatus may include a plurality of communication circuits 204. For example, the communication device may include a first communication circuit that may be used to communicate with other devices for collecting information and a second communication circuit for communication with the information processing apparatus. For example, when the communication device is a base station, the communication device may include a wired communication circuit for communication with network nodes within the core network or other base stations, and a wireless communication circuit for communication with the terminal device (e.g., operating according to a cellular communication standard such as 5G and LTE, etc.). Note that for the case in which the communication device is a base station, the communication device may establish an X2 interface with another base station and communicate directly, or may communicate with other base stations via the core network using an S1 interface. Moreover, for the case in which the communication device is a base station, the communication device may establish a wireless link with another device to establish communication for connecting with other base stations or core networks. The communication device and the information processing apparatus may have a communication circuit for communicating with each of the supported communication standards. The input/output circuit 205, for example, controls the output of screen information to be displayed on a display device (not illustrated) or the output of audio information to be output from a speaker, in addition to controlling the receiving of a user input via a keyboard, a pointing device, or the like. Note that the input/output circuit 205 may control a device that performs input/output, such as a touch panel, as a single unit. Note that the configuration of FIG. 2 is an example, and a communication device and an information processing apparatus may be configured by dedicated hardware to perform the processing described above.

Figure 3:
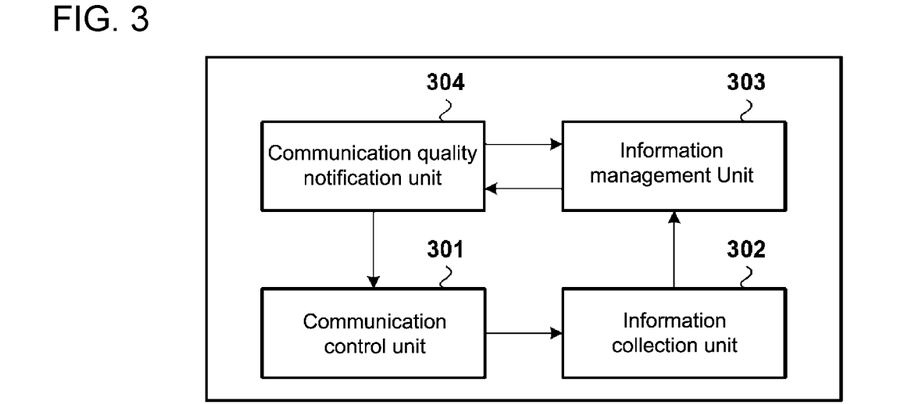
FIG. 3 is a diagram illustrating an example of a functional configuration of a communication device in accordance with one aspect of the present disclosure.

FIG. 3 illustrates an example of a functional configuration of the communication device according to the present disclosure. The communication device includes, in one example, a communication control unit 301, an information collection unit 302, an information management unit 303, and a communication quality notification unit 304.

The communication control unit 301 performs communication execution control for collecting information and notifying information. For example, the communication control unit 301 performs control for establishing a communication link with another device and performing communication in order to collect information. When the communication device is a base station and collects information regarding communication with the terminal device, for example, the communication control unit 301 may establish a wireless link with the terminal device and measure the communication quality for communication on the wireless link, making it possible to acquire communication quality. Moreover, when the communication device includes an external device, such as an operator device for remote operation, or a network node on the core network, for example, the communication control unit 301 may acquire the communication quality by establishing a communication link including a wireless section via a base station and possibly a wired section with a terminal device, then measuring the communication quality in the communication link. Note that the communication control unit 301 may acquire information on the type of mating device in acquiring the communication quality. The communication control unit 301 may establish a communication link for providing information to the information processing apparatus. For example, for the case in which the communication device is a base station and the information processing apparatus is a terminal device, the communication control unit 301 performs control for establishing a wireless link with the terminal device and performing communication. Furthermore, for the case in which the information processing apparatus is an external device or a network node, the communication control unit 301 performs control to establish a communication link including a wired section or a wireless section with the device and provide information via the communication link.

The information collection unit 302 collects communication quality including communication delays of a communication link with other devices via the communication control unit 301. At this time, the information collection unit 302 combines and acquires information on the types of other devices. Note that the information collection unit 302 collects information, for example, between one or more other devices. Moreover, the information collection unit 302 may also perform one or more information collections with one other device. The information collection unit 302 may perform information acquisition with a number of other devices to collect the actually measured communication quality acquired in the communication between the communication device and the multiple types of other devices. The information collection unit 302 may perform multiple information collections with other devices to reduce errors in the actually measured communication quality in communication between the communication device and other devices. Note that the information collection unit 302 may, for example, collect communication quality between the first other device (for example, the terminal device) and the second other device (for example, the base station), and the information on the type of the first other device. That is, the communication device may collect information regarding communications not passing through the communication device itself. For example, the communication device may be a network node and may collect information regarding communications performed by a subordinate base station.

The information management unit 303 manages information collected by the information collection unit 302. The information management unit 303 may manage only communication quality corresponding to any type, or may manage multiple communication qualities corresponding to each of multiple types in association with a corresponding type. For example, for the case in which multiple communication qualities are collected for one type, the information management unit 303 may manage the multiple communication qualities as is or may manage values that are not the collected information quality itself identified from the multiple information qualities such as values that indicate with how much precision a particular application such as an average value or distribution of the multiple communication quality, or remote operation, may be achieved. The information management unit 303 may manage communication quality information in the form of information regarding the communication quality to be transmitted to the information processing apparatus. In this case, as described above, the communication quality to be managed may be adjusted so as to be different from the actual communication quality depending on the type of terminal device.

The communication quality notification unit 304 notifies the information processing apparatus of communication quality information corresponding to at least one type via the communication control unit 301. At this time, for the case in which the information management unit 303 manages information in the form of information regarding the communication quality to be transmitted to the information processing apparatus, the communication quality notification unit 304 acquires information regarding the communication quality corresponding to the type of the transmission target from the information management unit 303, and transmits the information to the information processing apparatus. Moreover, for the case in which the information management unit 303 manages communication quality information other than in the format notified to the information processing apparatus, the communication quality notification unit 304 converts the information acquired from the information management unit 303 into a format for notifying the information processing apparatus. In this case, as described above, the communication quality to be managed may be adjusted so as to be different from the actual communication quality depending on the type of transmission target. Note that the communication quality notification unit 304 may acquire information indicating the type of information processing apparatus or the type of control target by the information processing apparatus, for example, via the communication control unit 301, and transmit information regarding the communication delay corresponding to the type indicated by the acquired information to the information processing apparatus.

Figure 4:
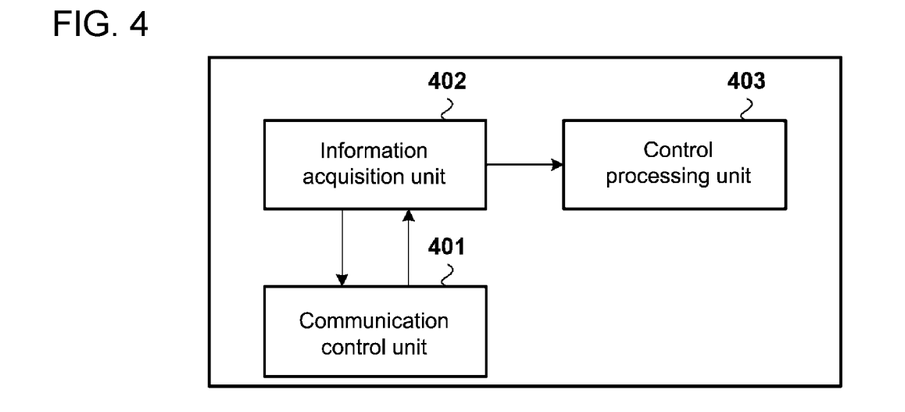
FIG. 4 is a diagram illustrating an example of a functional configuration of an information processing apparatus in accordance with one aspect of the present disclosure.

FIG. 4 is a functional configuration example of an information processing apparatus according to the present disclosure. The information processing apparatus includes, for example, a communication control unit 401, an information acquisition unit 402, and a control processing unit 403. The communication control unit 401 establishes a connection with the communication device and controls communications. In some cases, the communication control unit 401 may establish a communication link with the other device to be controlled and perform control for performing communication. The information acquisition unit 402 acquires at least information regarding the communication quality transmitted from the communication device as described above. For example, for the case in which the information processing apparatus is a terminal device and acquires information to control self-positioning, the information acquisition unit 402 acquires communication quality information corresponding to the type of device itself. When the information processing apparatus is an external device or a network node that controls other devices, for example, the information acquisition unit 402 acquires information regarding the communication quality corresponding to the type of the other device. The control processing unit 403 executes control of the device or other device to be controlled on the basis of the acquired communication quality information. This control may be, for example, a handover control. In other words, the information processing apparatus may select the base station that is the handover destination based on information regarding the communication quality when the terminal device itself is the terminal device. For the case in which the device itself controls the other device, the information processing apparatus may select a base station that is the handover destination of this other device based on information regarding the communication quality. The information processing apparatus may select, for example, a base station that may reduce communication delays between a terminal device installed in a remote driving vehicle and an operator device for remote operation as a base station that is the handover destination. The control processing unit 403 may execute control processing other than the handover, such as, for example, control of an application of the device to be controlled. For example, according to an example, the control processing unit 403 may control the quality of the application such that it decreases the quality of the application when the communication quality is relatively poor and increases the quality of the application when the communication quality is relatively high.

Figure 5:
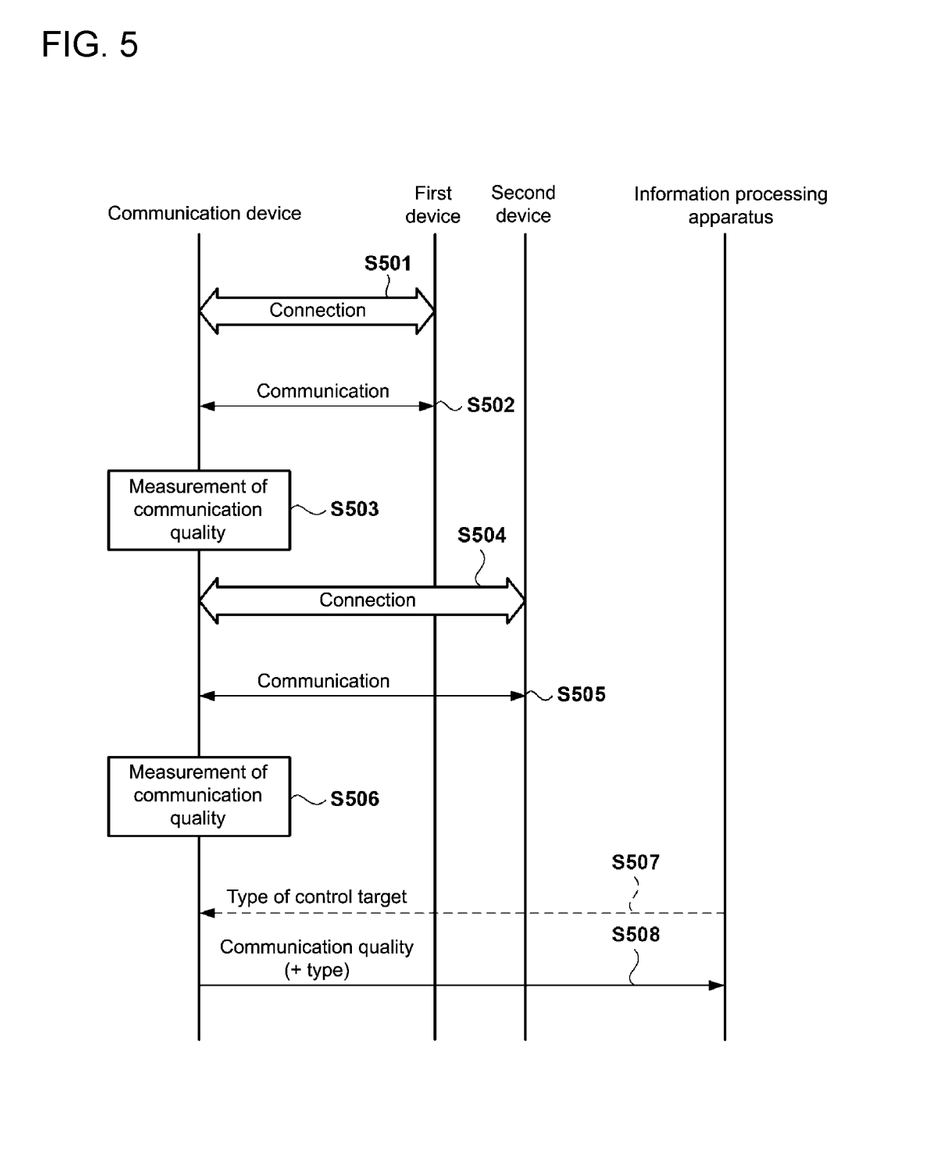
FIG. 5 is a diagram illustrating an example of a process flow executed by a communication system in accordance with one aspect of the present disclosure.
Figure 6:
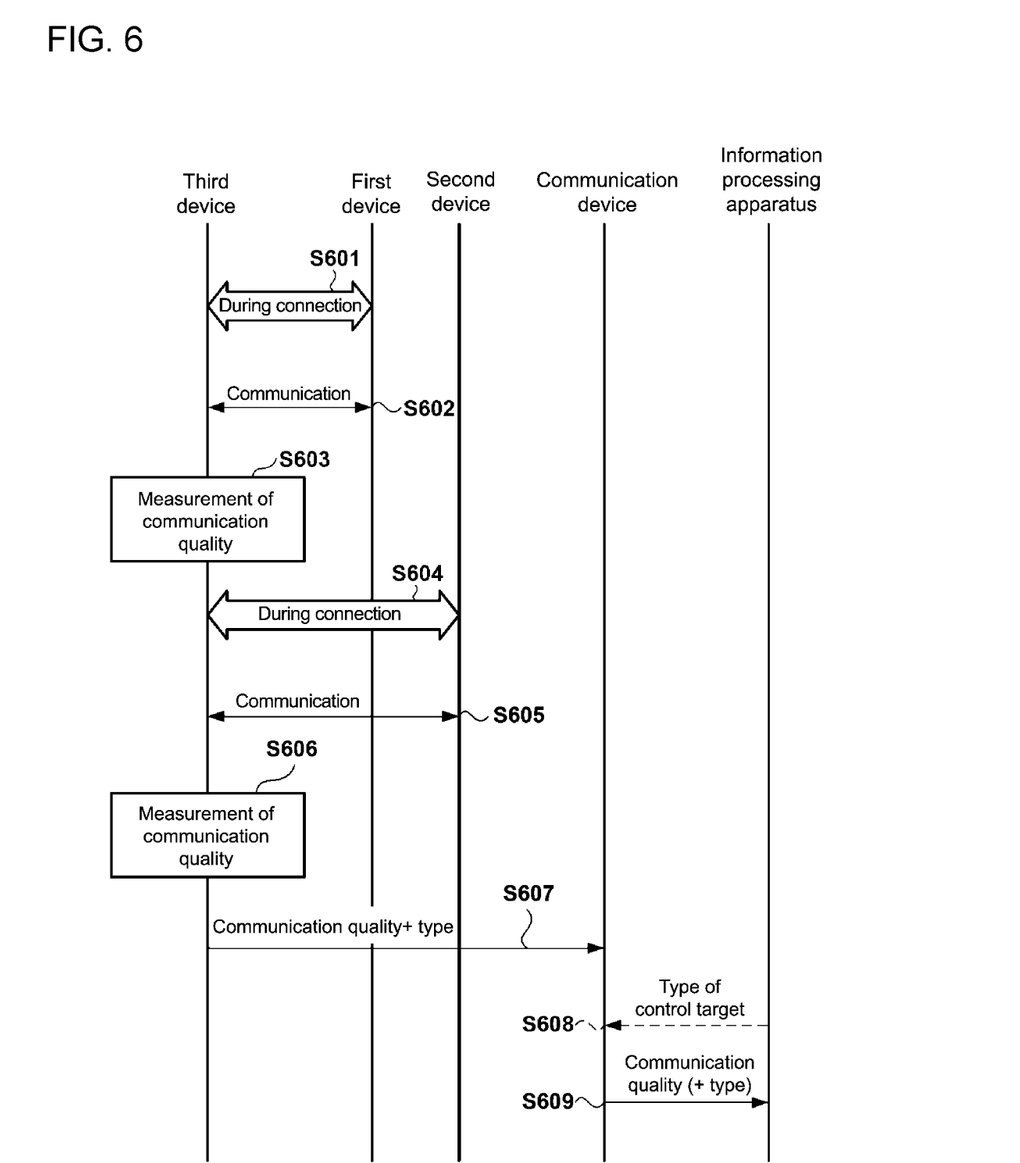
FIG. 6 is a diagram illustrating an example of the process flow executed by the communication system in accordance with one aspect of the present disclosure.

Next, FIGS. 5 and 6 describe examples of the process flow performed in the communication system according to the present disclosure.

FIG. 5 illustrates an example and a case in which a communication device acquires communication quality by measuring the communication quality in communication at the communication link between the communication device and another communication device that communicates with the communication device by establishing a communication link with the communication device. In the process, for example, the communication device establishes a connection with the first device (S501) and communicates (S502) with the first device. Then, in the communication, the communication device measures and acquires the communication quality such as communication delays (S503). At this time, the communication device acquires the information on the type of the first device as well. Note that, for example, the communication device is a base station and the first device is an on-board terminal device of a remote driving vehicle. In this case, while the communication device may measure only the communication quality associated with communication between the device itself and the first device, it may also measure and acquire communication quality for communication between the operator device and the first terminal via remote operation. In other words, the communication device may acquire communication quality information such as communication delays associated with a communication link including, for example, a wireless section and a wired section, when the communication between the first terminal and the mating device of the communication of the first terminal is performed via the communication device. Similarly, the communication device also acquires information on the type of device and communication quality information for the other device (second device) connected to the device itself (S504, S505, and S506). In this way, the communication device may collect communication quality information for communication with other devices connected to the communication device itself, and manage information on the type of device and communication quality information associated with each other. The communication device then provides information to the information processing apparatus based on the collected communication quality (S508). At this time, the communication device may notify the information processing apparatus of information regarding the type of device to which the communication quality corresponds, along with information regarding the communication quality. However, information regarding this type may not necessarily be provided, for example, the information processing apparatus may transmit in advance information that specifies the type of device to be provided, such as the type of device to be controlled, to the communication device (S507). In this case, the communication device provides information on the communication quality corresponding to the specified type to the information processing apparatus (S508), but does not provide information regarding the type of device. Note that, for the case in which the communication device receives two or more types of specifications from the information processing apparatus, for example, the communication device may provide information on the type of the device.

FIG. 6 illustrates an example of a case in which a communication device acquires, from another device, communication quality for communication in a communication link established without the communication device. In this process, another device (third device) different from the communication device collects information with processing performed by the communication device in S501 to S506 of FIG. 5 (S601, S602, S603, S604, S605, and S606). Then, the communication device acquires, from the device (third device) that collects the information, communication quality information and information on the type of other devices (the first device and the second device) corresponding to the communication quality (S607). Note that the communication device may acquire information periodically transmitted from the third device, for example, or may acquire this information by requesting information from the third device. The communication device then transmits information regarding the communication quality to the information processing apparatus, for example, in response to a request from the information processing apparatus along with information on the type corresponding to the communication quality in some cases (S608, S609). Processing of S608, S608, and S609 is similar to the processing of S507 and S508.

As described above, according to the present disclosure, by providing communication quality information to the information provision device by the communication device, the information provision device may execute control processing of the communication device or another device to be controlled in accordance with the communication quality.

Note that in the present disclosure, while the information of the actually measured communication quality has been described as being collected and provided based on the cellular communication standard, the present disclosure is not limited thereto. For example, based on a wireless LAN, the actually measured communication quality information may be collected and provided. That is, information on the actual communication quality in communication with a communication standard supported by a device with the communication quality to be measured, for example, may be collected and provided.

According to one aspect of the present disclosure, a communication device according to the abovementioned disclosure is provided. The communication device may include collecting information regarding the communication quality of communications by a first other communication device and information regarding the type of the first other communication device and transmitting information regarding the communication quality of communications by the first other communication device and the information regarding the type to a second other communication device based on the information collected.

According the above, the communication quality (e.g., communication delays) during communication of a past communication device (e.g., a base station) and a first other communication device (e.g., a terminal) is collected in association with the type of the first other communication device (e.g., a type classified by applications such as on-board terminals or smart phones, automated operation, or remote operation). Then, the communication device notifies a second other communication device (e.g., the terminal, base station, and network node around the communication device) along with the type of information indicating how much communication quality is present. As a result, the second other communication device may know in advance the communication quality when a device, such as a certain type of terminal, performs communication via the communication device. Thus, for example, for the case in which the second other communication device is a terminal, it is possible to know from the information of the communication quality how high the communication quality of the communication device is assuming that the communication device is to be in communication with the communication device.

In one example, when the information is broadcast, the terminal may ascertain the communication quality before connecting to the communication device. Furthermore, because communication quality information corresponding to at least one of the types of the first other communication device (terminal) is notified, the terminal ignores information corresponding to types not associated with the terminal itself, enabling only the acquisition of information corresponding to the type associated with the terminal itself. By being notified of communication quality information for each type, the communication quality information based on the characteristic may be notified, for example, for a case in which the communication quality during movement and the communication quality during static are different. Further, for the case in which the second other communication device is the base station, the communication quality information when communicating with the communication device may be notified to a subordinate terminal of the base station. In one example, for the case in which the communication device is a base station, the communication quality when communicating with a communication device may be notified to a terminal connected to the adjacent base station by acquiring communication quality information. For the case in which the second communication device is a network node, the network node may control each base station based on the information. In one example, if a network node is provided with an automatic operation control function, appropriate information may be provided to the control function. Note that, for the case in which the communication device is a terminal, for example, the communication quality when communicating with a fixed base station, the communication quality when communicating with a mobile base station, and the like are notified to the second other communication device. At this time, for the case in which the second other communication device is a terminal, the second other communication device may acquire the expected communication quality when connected to a fixed base station or to a mobile base station, and may determine whether, for example, communication to a mobile base station is accepted.

According to one aspect of the present disclosure, a communication device is provided. The communication device may include a memory for storing computer readable code and a processor operatively coupled to the memory, the processor configured to perform processes. The processes may include collecting information regarding a communication quality of a first other communication device and information regarding a type of the first other communication device and transmitting the information regarding the communication quality of the first other communication device to a second other communication device based on the information collected.

The communication device according to the above, wherein the processor, operatively coupled to the memory, is configured to manage the communication quality corresponding to each type of communication device.

The communication device according to the above, wherein the processor, operatively coupled to the memory, is configured to: acquire information indicating a type of the second other communication device, and transmit information regarding the communication quality when the type of the second other communication device is or similar to the type of the first other communication device.

The communication device according to the above, wherein the processor, operatively coupled to the memory, is configured to generate information regarding a communication quality corresponding to a predetermined type when communicating with a plurality of third other communication devices.

The communication device according to the above, wherein the type includes a first type indicating that a device is moving and a second type indicating that a device is fixed.

The communication device according to the above, wherein the processor, operatively coupled to the memory, is configured to identify a value regarding the communication quality of the first other communication device classified into the first type as a lower value.

The communication device according to the above, wherein the processor, operatively coupled to the memory, is configured to classify the type of the first other communication device based on a movement speed of the first other communication device.

The communication device according to the above, wherein identifying the value includes setting a magnitude of a difference between the communication quality with the movement speed of the first other communication device.

The communication device according to the above, wherein the processor, operatively coupled to the memory, is configured to identify the value regarding the communication quality of the first other communication device classified into the second type as higher value.

The communication device according to the above, wherein the processor, operatively coupled to the memory, is configured to determine the type depending on whether the first other communication device is installed in a vehicle.

The communication device according to the above, wherein the communication device is a base station and the first other communication device is a terminal.

The communication device according to the above, wherein communication is performed through the base station.

The communication device according to the above, wherein the second other communication device is a terminal for performing communication via the base station or another base station.

The communication device according to the above, wherein the second other communication device is a network node.

The communication device according to the above, wherein the communication quality includes a communication delay via the communication device.

According to another aspect of the present disclosure, a communication device is provided. The communication device may include a memory storing instructions when executed by a processor causes the processor to perform processes. The processes may include collecting information regarding the communication quality by a first other communication device and information regarding a type of the first other communication device and transmitting, based on the collected information, information regarding the communication quality along with information regarding the type to a second other communication device.

According to yet another aspect of the present disclosure, a computer-implemented handover method in a communication device is provided. The method may include collecting information regarding the communication quality of a first other communication device and information regarding a type of the first other communication device based on the collected information, the information regarding the communication quality of the first other communication device along with the information regarding the type to a second other communication device.

The computer-implemented handover method according to the above, wherein a type of the second other communication device is similar to the type of the first other communication device, the type indicating an intended use of communication.

The communication device according to the above, wherein the type indicates an intended use of communication.

The communication device according to the above, wherein the intended use is automatic driving or remote control.

The communication device according to the above, wherein the type distinguishes in-vehicle terminals or smartphones.

The invention claimed is:

1. A communication device, comprising:
   a memory for storing computer readable code; and
   a processor operatively coupled to the memory, the processor configured to:
      collect information regarding a communication quality of a first other communication device and information regarding a type of the first other communication device;
      transmit the information regarding the communication quality of the first other communication device to a second other communication device based on the information collected.

2. The communication device according to claim 1, wherein the processor, operatively coupled to the memory, is configured to manage the communication quality corresponding to each type of communication device.

3. The communication device according to claim 1, wherein the processor, operatively coupled to the memory, is configured to:
   acquire information indicating a type of the second other communication device; and
   transmit information regarding the communication quality when the type of the second other communication device is or similar to the type of the first other communication device.

4. The communication device according to claim 1, wherein the processor, operatively coupled to the memory, is configured to generate information regarding a communication quality corresponding to a predetermined type when communicating with a plurality of third other communication devices.

5. The communication device according to claim 1, wherein the type includes a first type indicating that a device is moving and a second type indicating that a device is fixed.

6. The communication device according to claim 5, wherein the processor, operatively coupled to the memory, is configured to identify a value regarding the communication quality of the first other communication device classified into the first type as a lower value.

7. The communication device according to claim 6, wherein the processor, operatively coupled to the memory, is configured to classify the type of the first other communication device based on a movement speed of the first other communication device.

8. The communication device according to claim 7, wherein identifying the value comprises setting a magnitude of a difference between the communication quality with the movement speed of the first other communication device.

9. The communication device according to claim 5, wherein the processor, operatively coupled to the memory, is configured to identify the value regarding the communication quality of the first other communication device classified into the second type as higher value.

10. The communication device according to claim 1, wherein the processor, operatively coupled to the memory, is configured to determine the type depending on whether the first other communication device is installed in a vehicle.

11. The communication device according to claim 1, wherein the communication device is a base station and the first other communication device is a terminal.

12. The communication device according to claim 11, wherein communication is performed through the base station.

13. The communication device according to claim 12, wherein the second other communication device is a terminal for performing communication via the base station or another base station.

14. The communication device according to claim 1, wherein the second other communication device is a network node.

15. The communication device according to claim 1, wherein the communication quality includes a communication delay via the communication device.

16. A communication device comprising:
a memory storing instructions when executed by a processor causes the processor to:
collect information regarding the communication quality by a first other communication device and information regarding a type of the first other communication device; and
transmit, based on the collected information, information regarding the communication quality along with information regarding the type to a second other communication device.

17. A computer-implemented handover method in a communication device, the method comprising:
collect information regarding the communication quality of a first other communication device and information regarding a type of the first other communication device; and
transmit, based on the collected information, the information regarding the communication quality of the first other communication device along with the information regarding the type to a second other communication device.

18. The communication device of claim 1, wherein the type indicates an intended use of communication.

19. The communication device of claim 18, wherein the intended use is automatic driving or remote control.

20. The communication device of claim 1, wherein the type distinguishes in-vehicle terminals or smartphones.

* * * * *